(No Model.)  2 Sheets—Sheet 1.

H. V. HARTZ.
MACHINE FOR MAKING HOOKS.

No. 334,432.  Patented Jan. 19, 1886.

WITNESSES:
W. W. Hollingsworth
Edw. U. Byrn

INVENTOR:
H. V. Hartz
BY Munn & Co.
ATTORNEYS.

(No Model.) 2 Sheets—Sheet 2.

H. V. HARTZ.
MACHINE FOR MAKING HOOKS.

No. 334,432. Patented Jan. 19, 1886.

WITNESSES:
W. W. Hollingworth
Edw. A. Byer

INVENTOR:
H. V. Hartz
BY Munn
ATTORNEYS.

UNITED STATES PATENT OFFICE.

HENRY V. HARTZ, OF CLEVELAND, OHIO.

MACHINE FOR MAKING HOOKS.

SPECIFICATION forming part of Letters Patent No. 334,432, dated January 19, 1886.

Application filed July 25, 1884. Renewed June 15, 1885. Serial No. 168,798. (No model.)

*To all whom it may concern:*

Be it known that I, HENRY V. HARTZ, a citizen of the United States, residing at Cleveland, in the county of Cuyahoga and State of Ohio, have invented certain new and useful Improvements in Machines for Making Hooks, of which the following is a description.

Figure 1:
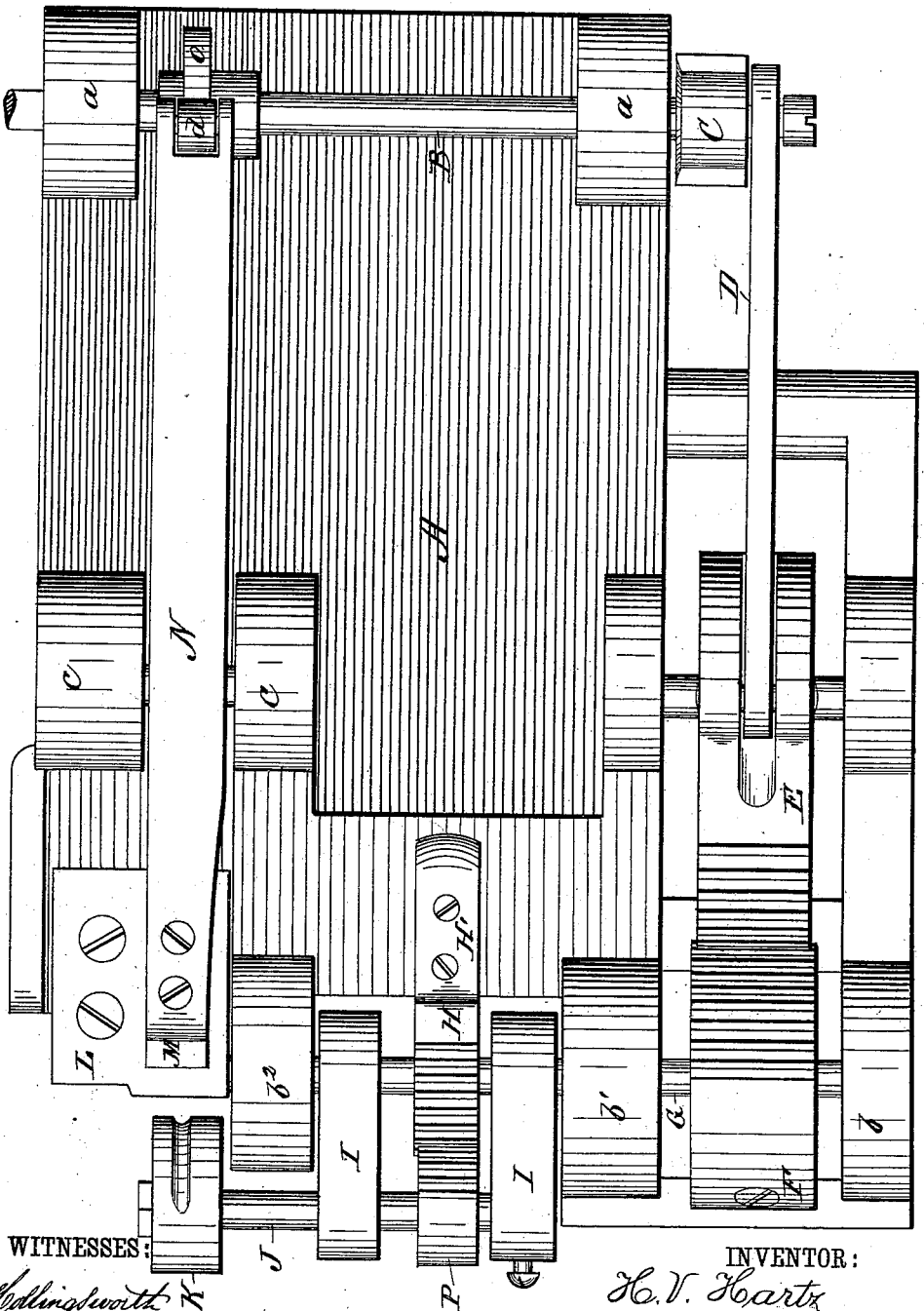
Figure 2:
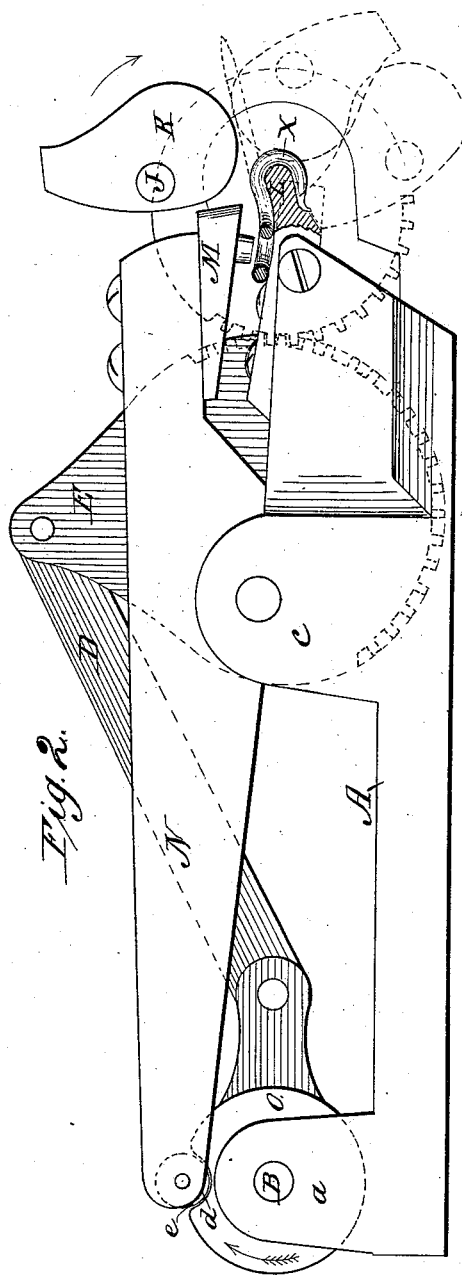
Figure 3:
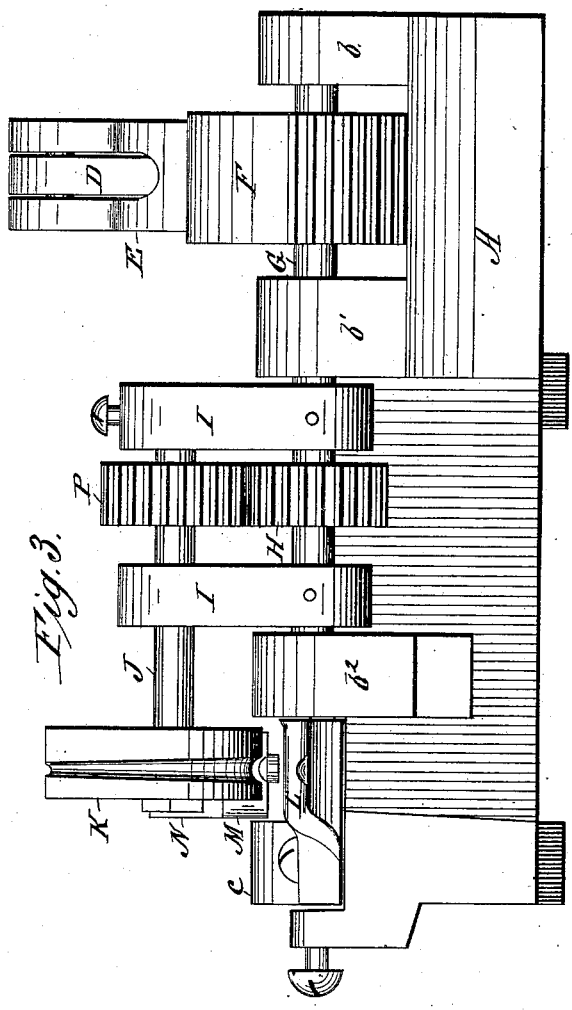

Figure 1 is a plan view. Fig. 2 is a side view with the former in section. Fig. 3 is a front end view.

My invention is designed to provide a machine for bending metal hooks; and to this end it consists in the peculiar construction and arrangement of the parts of such machine, whereby the hook is bent into shape with rapidity to form a perfect and strong hook, as hereinafter fully described.

In the drawings, A represents the metal bed-frame, in one end of which is journaled in bearings $a$ $a$ the main drive-shaft B, actuated by power in any suitable way. At one end of this shaft is a rigid crank, C, jointed to a connecting-rod, D, which connects with a toothed segment, E, journaled in bearings in the bed-frame. This toothed segment gears with a toothed wheel, F, keyed rigidly on a shaft, G, that has three bearings, $b$ $b'$ $b^2$, at the end of the bed-frame.

Between the bearings $b'$ $b^2$ there is a toothed segment, H, which is pierced centrally by the shaft G, but is disconnected therefrom. This segment H is provided with an extension, H', Fig. 1, which is firmly bolted to the bed-frame.

To the shaft G there are attached two rigid arms, I I, one occupying a position between one of the bearings, $b'$, and the toothed segment H, and the other occupying a position between the other bearing, $b^2$, and the toothed segment. These two arms I I carry a short rock-shaft, J, which has a segmental gear, P, fixed rigidly on it, and meshing with the stationary segmental gear H. On the extreme outer end of this shaft J is rigidly fixed the bending-pulley K, which is of an eccentric shape, corresponding to the curve of the hook to be formed, and grooved to centralize the hook in bending it around the former. L is this former, which is bolted to the edge of the bed-plate opposite the bending-pulley, and is of a shape corresponding to the inside contour of the hook to be bent.

Immediately above the former L is a pinching-jaw, M, fixed to the end of a lever, N, fulcrumed in bearings $c$ $c$ on top of the bed-frame. The rear end of this lever is the longer and is provided with an anti-friction roller, $d$, which bears upon a cam, O, on the main shaft B, which cam has an opening, $e$, in its periphery, for the purpose hereinafter described.

The operation of this machine is as follows: The eye end of the hook, having been previously formed, is placed beneath the holding-jaw M, being fixed in its position by a teat or jag on said jaw which enters the eye. The device being now in the position shown in Fig. 2, with the rear end of the lever N down in the opening $e$ in the cam O, as soon as the main shaft B turns and the cam O lifts the rear end of the lever N the jaw M grasps and holds the eye of the hook firmly. Then the crank C and rod D rock the gears E and F, and in rocking the shaft G they cause the rigid arms I I of said shaft to swing the short shaft J around the shaft G as a center, carrying the grooved bending-pulley around the former, and as it passes, said grooved pulley turns on its individual axis from the action of the gear P on stationary gear H, so that the bending-pulley turns through the successive positions 1 2 3 around the former, bending the iron into the shape of a hook, as shown at $x$.

The object in giving a rotation to the bending-pulley about its own axis, as well as around the shaft G, is to prevent the dragging or drawing of the iron of the hook out of shape or weakening it by fractures, which would be caused by friction in the absence of this rolling action.

The former L, bending-pulley K, and pinching-jaw M are all detachably connected to their actuating parts, and to make hooks of different sizes it is only necessary to substitute different sizes of former, bending-pulley, and jaw.

In rolling the hook it will be seen that the outturned end of the hook or the counter-hook is formed at the same time by the shape of the bending-pulley and former.

I am aware of the Patent No. 220,074, and disclaim anything shown therein. My invention is distinguished from that construction, first, in that my bending device K is of a shape to complete the reverse or outer bend of the hook in one operation with the body portion, and also, further, in that my bending device K has a positively-actuated individual rotation, and does not rely upon the friction with the metal, as does the patent referred to, which friction drags the metal and is objectionable.

Having thus described my invention, what I claim as new is.

1. The combination, in a hook-machine, of a former corresponding to the inner contour of the hook, a holding or clamping jaw, and a bending device having a rotary movement around the former and a positively-actuated individual rotation about its own axis, as and for the purpose described.

2. The combination, in a hook-machine, of a former corresponding to the inner contour of the hook, a holding or clamping jaw, and a bending device having a rotary movement around the former and a secondary individual rotation, the said bending device being made of the shape shown at K, to give the reverse curve or outward turn to the end of the hook in one operation, as and for the purpose described.

3. The combination of the bed-frame A with former L, the holding-jaw M, the bending-pulley K, shaft J, with gear P, the shaft G, with arms I I, and the stationary gear H, as and for the purpose described.

4. The combination of the bed-frame A, shaft B, with cam O, having opening e, the lever N, with holding-jaw M, the former L, bending-pulley K, shaft J, with gear P, the shaft G, with arms I I, stationary gear H, gears E and F, the pitman D, and crank C, substantially as and for the purpose described.

HENRY V. HARTZ.

Witnesses:
L. WOLF,
REETAN STRAUSS.